United States Patent [19]

Kuroki et al.

[11] Patent Number: 4,686,626
[45] Date of Patent: Aug. 11, 1987

[54] PITCHING-SUPPRESSIVE CONTROL SYSTEM AND METHOD FOR AN AUTOMOTIVE VEHICLE SUSPENSION

[75] Inventors: Junsuke Kuroki; Fukashi Sugasawa, both of Yokohama, Japan

[73] Assignee: Nissan Motor Company, Ltd., Tokyo, Japan

[21] Appl. No.: 919,602

[22] Filed: Oct. 14, 1986

Related U.S. Application Data

[63] Continuation of Ser. No. 649,484, Sep. 11, 1984, abandoned.

[30] Foreign Application Priority Data

Sep. 17, 1983 [JP] Japan .................................. 58-171878

[51] Int. Cl.$^4$ ...................... B60G 17/00; G06F 15/20
[52] U.S. Cl. ................................... 364/426; 280/703; 280/707; 188/299
[58] Field of Search ................ 364/424, 426; 280/702, 280/703, 707, 709, 710, 714, 6 R; 188/272, 299; 267/64.15; 303/22 A, 6 C; 180/89.15

[56] References Cited

U.S. PATENT DOCUMENTS

| | | | |
|---|---|---|---|
| 2,247,749 | 7/1941 | de Venel | 280/124 |
| 3,003,783 | 10/1961 | Brueder | 280/124 |
| 3,029,089 | 5/1962 | Nashman | 280/124 |
| 3,321,210 | 5/1967 | Delchev | 280/6 |
| 3,603,612 | 9/1971 | Hill | 188/299 |
| 3,608,925 | 9/1971 | Murphy | 280/112 |
| 3,677,561 | 7/1972 | McNally | 267/124 |
| 3,827,538 | 8/1974 | Morgan | 188/319 |
| 3,850,027 | 11/1974 | Nakanishi et al. | 73/105 |
| 3,902,691 | 9/1975 | Ott | 280/6 |
| 3,920,283 | 11/1975 | Strader | 303/22 A |
| 3,945,664 | 3/1976 | Hiruma | 280/124 |
| 3,992,239 | 11/1976 | Hiruma | 280/703 |
| 3,995,883 | 12/1976 | Glaze | 280/707 |
| 4,065,154 | 12/1977 | Glaze | 188/299 |
| 4,100,795 | 7/1978 | Panetti | 73/146 |
| 4,105,216 | 8/1978 | Graham et al. | 280/267 |
| 4,152,000 | 5/1979 | Meisel, Jr. | 188/272 |
| 4,327,936 | 5/1982 | Sekiguchi | 280/711 |
| 4,333,668 | 6/1982 | Hendrickson et al. | 280/707 |
| 4,349,077 | 9/1982 | Sekiguchi et al. | 280/707 |
| 4,363,092 | 12/1982 | Abo et al. | 364/200 |
| 4,401,310 | 8/1983 | Ishikawa et al. | 280/6.1 |
| 4,402,375 | 9/1983 | Glaze | 180/169 |
| 4,433,386 | 2/1984 | Este | 73/105 |
| 4,436,318 | 3/1984 | Ichikawa et al. | 280/104 |
| 4,473,319 | 9/1984 | Spangler | 404/84 |
| 4,483,409 | 11/1984 | Fun | 280/703 |
| 4,506,751 | 3/1985 | Stephens | 188/272 |
| 4,506,909 | 3/1985 | Nakashima et al. | 280/707 |
| 4,526,401 | 7/1985 | Kakizaki et al. | 280/707 |
| 4,527,676 | 7/1985 | Emura et al. | 188/299 |
| 4,540,188 | 9/1985 | Meloche et al. | 267/707 |
| 4,555,126 | 11/1985 | Ishimitsu et al. | 280/707 |
| 4,572,317 | 2/1986 | Isono et al. | 280/703 |
| 4,600,215 | 7/1986 | Kuroki et al. | 280/707 |
| 4,616,848 | 10/1986 | Sugasawa et al. | 280/707 |

FOREIGN PATENT DOCUMENTS

| | | |
|---|---|---|
| 0080291 | 6/1983 | European Pat. Off. |
| 0091017 | 10/1983 | European Pat. Off. |
| 2489458 | 3/1982 | France |
| 2006131 | 5/1979 | United Kingdom |
| 2119473 | 11/1983 | United Kingdom |

OTHER PUBLICATIONS

SAE 680750 "Some Fundamental Limitations of Active & Passive Vehicle Suspension Systems".
"Circle Track", A Guide to Dirt Track Suspension, pp. 78–87, by Eric Rickman.
SAE Technical Paper Series 800520, "An Optimal Linear Active Suspension with Finite Road Preview".

Primary Examiner—Felix D. Gruber
Assistant Examiner—Thomas G. Black
Attorney, Agent, or Firm—Leydig, Voit & Mayer

[57] ABSTRACT

An automotive vehicle suspension having a damper with variable damping characteristics, specifically, an adjustable damping force. A controller responds to an application and release of the vehicle brakes by increasing the damping force, to suppress nose-dive of the vehicle at the beginning of braking and to suppress pitching motion of the vehicle at the end of braking.

17 Claims, 18 Drawing Figures

PITCHING-SUPPRESSIVE CONTROL SYSTEM AND METHOD FOR AN AUTOMOTIVE VEHICLE SUSPENSION

This application is a continuation of application Ser. No. 649,484, filed Sept. 11, 1984, and now abandoned.

BACKGROUND OF THE INVENTION

The present invention relates generally to a suspension control system for an automotive vehicle, which controls the damping force against the bouncing behavior of sprung body relative to unsprung wheels. More particularly, the invention relates to a control system for controlling a variable damping-force damper so as to reduce pitching motion of the vehicle body during deceleration of the vehicle.

Published Japanese Utility Model Application (Jikkai) Sho. 56-111009, discloses a suspension system having a variable shock absorber with adjustable shock-absorbing characteristics. The shock absorber is associated with a controller for controlling the damping force thereof. The controller operates the shock absorber to produce a higher damping force when it detects deceleration of the vehicle. The higher damping force is maintained as long as the vehicle brakes are applied to decelerate the vehicle. In other words, as soon as the brakes are released, the damping force to be produced by the shock absorber is reduced.

When applying brakes in order to stop the vehicle, the center of gravity shifts forward due to the inertia of the vehicle, which causes the vehicle to "nose dive". By adjusting the damping force to be produced by the shock absorber to HIGH, the magnitude of nose dive can be limitted. On the other hand, at the end of vehicle deceleration, the center of, gravity moves rearward, causing at the front end of the vehicle to rebound. In particular, when the brake is released immediately after stopping of the vehicle, the controller operates the shock aborber to lower the damping force. This may enhance the rebounding behavior of the vehicle and degrade riding comfort.

On the other hand, in the initial stage of deceleration of the vehicle, the pitching moment applied to the vehicle is quite high. The pitching moment gradually drops with the vehicle speed due to the reduction of counteracting torque on the axles. Therefore, a high damping force is required at the initial stage of braking or deceleration. After the vehicle stops, the center of gravity moves back to its initial position since the inertia has vanished, causing the vehicle body to rebound. To prevent this, a high damping force may be required. On the other hand, after the initial stage of vehicle deceleration, a low damping force would probably be adequate as substantial movement of the center of gravity does not occur during this stage.

SUMMARY OF THE INVENTION

Therefore, it is an object of the present invention to provide a suspension control system which can limit the magnitude of pitching motion during deceleration of the vehicle.

Another and more specific object of the invention is to provide a suspension control system which satisfactorily prevents the vehicle from rebounding at the end of vehicle deceleration.

In order to accomplish the above-mentioned and other objects, a suspension control system, according to the present invention, operates a shock absorber with variable shock-absorbing characteristics to provide a higher damping force or spring force in response to application and release of vehicle brakes. The higher damping force may be maintained for a given period of time which should be long enough to reliably reduce the magnitude of pitching behavior of the vehicle.

BRIEF DESCRIPTION OF THE DRAWINGS

The present invention will be understood more fully from the detailed description given herebelow and from the accompanying drawings of the preferred embodiments of the invention, which, however, should not be taken to limit the invention to the specific embodiment or embodiments but are for explanation and understanding only.

In the drawings.

DESCRIPTION OF THE PREFERRED EMBODIMENT

Figure 1:
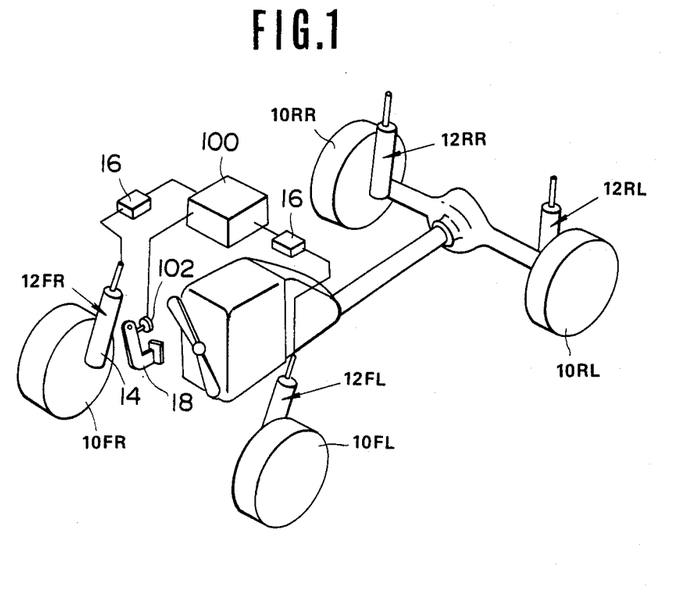
FIG. 1 is a diagram in perspective of essential elements of a vehicle suspension system with a variable damper to which the preferred embodiments of a shock absorbing-characteristics control system are applied.

Referring now to the drawings, particularly FIG. 1, the vehicle illustrated has a strut-type suspension system for front and rear wheels. Each of the front and rear wheels $10_{VL}$, $10_{FR}$, $10_{RL}$ and $10_{RR}$ supports some of the weight of a vehicle body through suspension struts $12_{FL}$, $12_{FR}$, $12_{RL}$ and $12_{RR}$. In the shown embodiment, the front suspension struts $12_{FL}$ and $12_{FR}$ have shock absorbers 14, which both have shock-absorbing characteristics variable between HIGH and LOW values.

Throughout the specification, the word "shock absorbing characteristics" should be understood as the ability to produce a shock-absorbing or damping force in response to relative displacement of the vehicle body, i.e. the sprung mass, and the vehicle wheel axle, i.e. the unsprung mass. In addition, "HIGH damping force" refers to the stronger level of damping force or spring force produced by the shock absorber 14 and "LOW damping force" refers to the weaker level of damping or spring force produced in response to an equally strong shock.

The shock absorbers 14 in the front strut $12_{FL}$ and $12_{FR}$ are connected to driver circuits 16 which operate the shock absorbers in two-way modes, switching the shock-absorbing characteristics between HIGH and LOW modes. Both driver circuits 16 are connected to a controller 100 which selects the operation mode of the shock absorbers 14 on the basis of preselected parameters indicative of vehicle driving conditions. The controller 100 is connected to a brake switch 102 which is closed when a brake pedal 18 is depressed and remains open as long as the brake is released. An ON/OFF signal from the brake switch 102 is utilized to control the shock-absorbing characteristics of the shock absorber 14 during vehicle deceleration.

In the pitch-preventive suspension control in accordance with the present invention, the shock absorber 14 is operated to produce a stronger damping force in response to transitions in the signal level from the brake switch 102. The stronger damping force mode is maintained for predetermined periods of time.

Figure 4:
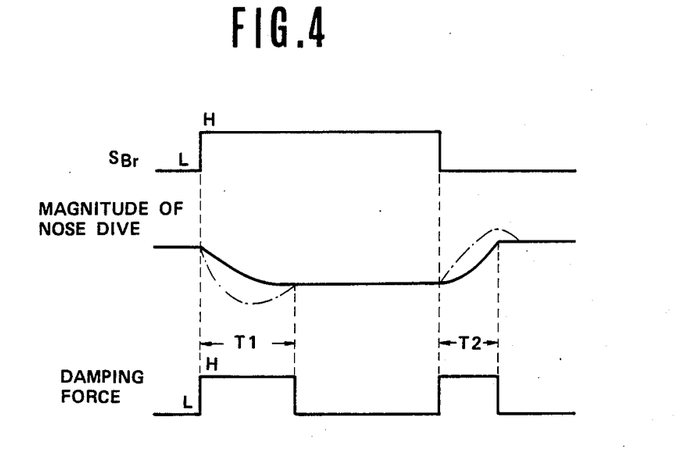
FIG. 4 is a chart showing the behavior of the front end of the vehicle during braking, which behavior is illustrated relative to the damping force producing characteristics of the shock absorber of FIG. 2.

Accordingly, as shown in FIG. 4, the controller 100 responds to closure of the brake switch by producing a HIGH mode control signal $S_H$ so as to activate the driver circuit 16 to operate the shock absorber in its HIGH damping force configuration (described later). The controller 100 holds the shock absorber in HIGH damping force mode for a given period of time $T_1$. After the given period of time $T_1$ expires, the controller 100 switches the control signal to LOW mode level $S_L$ to deactivate the driver circuit 16. Upon deactivation of the driver circuit, the shock absorber returns to the LOW damping force mode. Similarly, the controller 100 is responsive to switching of the brake switch position from closed to open to again produce the HIGH mode control signal $S_H$ and trigger the driver circuit 16. High damping force mode of the shock absorber 14 is maintained for a given period of time $T_2$. After the given period of time $T_2$ expires, the damping force produced by the shock absorber 14 returns to the LOW level.

Figure 2:
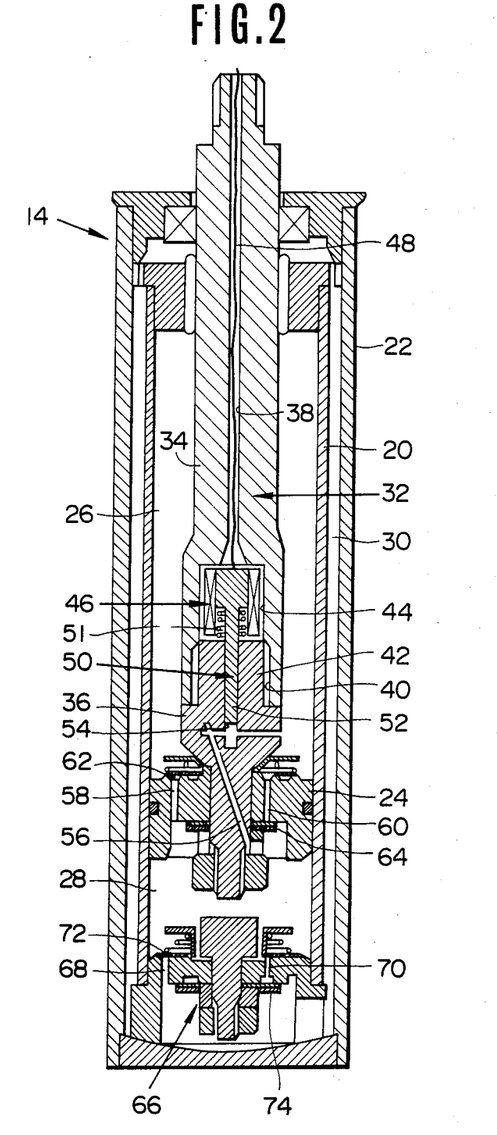
FIG. 2 is a cross-section of a shock absorber serving as the variable damper employed in the preferred embodiment of the suspension system.

In order to allow adjustment of the shock absorbing characteristics, the shock absorber 14 employed in the preferred embodiment, generally comprises an inner and an outer hollow cylinders 20 and 22 arranged coaxially, and a piston 24 fitting flush within the hollow space in the inner cylinder 20, as shown in FIG. 2. The piston 24 defines upper and lower fluid chambers 26 and 28 within the inner cylinder 20. The inner and outer cylinders define an annular fluid reservoir chamber 30.

The piston 24 is connected to the vehicle body (not shown) by means of a piston rod which is generally referred to by the reference number 32. The piston rod 32 comprises upper and lower segments 34 and 36. The upper segment 34 is formed with an axially extending through opening 38. The lower end of the through opening 38 opens into a recess 40 defined on the lower end of the upper segment 34. On the other hand, the lower segment 36 has an upper section 42 engageable to the recess 40 to define therein a hollow space 44. An actuator is disposed within the space 44. The actuator 46 is connected to the driver circuit 16 through a lead 48 extending through the through opening 38. The actuator 46 is associated with a movable valve body 50 which has a lower end extension 52 inserted into a guide opening 54 defined in the lower segment 36. The guide opening 54 extends across a fluid passage 56 defined through the lower segment 36 for fluid communication between the upper and lower fluid chambers 26 and 28.

The fluid passage 56 serves as a bypass for flow-restrictive fluid passages 58 and 60 formed in the piston 24. The upper end of the fluid passage 58 is closed by a resilient flow-restricting valve 62. Similarly, the lower end of the fluid passage 60 is closed by a flow-restricting valve 64. The flow-restricting valves 62 and 64 serve as check valves for establishing one-way fluid communication in opposite directions. In addition, since the flow-restriction valves 62 and 64 are biased toward the ends of the fluid passages 58 and 60, they open to allow fluid communication between the upper and lower fluid chambers 26 and 28 only when the fluid pressure difference between the upper and lower chambers 26 and 28 overcomes the effective pressure of the valves.

The cross-sectional area of the fluid passages 58 and 60 and the set pressures of the fluid-restriction valves 60 and 62 determine the damping force produced in HIGH damping force mode. The cross-sectional area of the fluid passage 56 determines the drip in the damping force in the LOW damping force mode in comparison with that in the HIGH damping force mode.

The movable valve body 50 is normally biased upwards by means of a coil spring 51. As a result, when the actuator 46 is not energized, the lower end section 52 of the valve body 50 is separated from the fluid passage 56 to allow fluid communication between the upper and lower chamber. When the actuator 46 is energized, the valve body 50 moves downwards against the resilient force of the coil spring 51 to block the fluid passage 56 with the lower end extension 52. As a result, fluid communication between the upper and lower fluid chambers 26 and 28 via the fluid passage 56 is blocked. When fluid communication through the fluid passage is permitted, the damping force produced by the shock absorber 14 remains LOW. On the other hand, when the fluid passage 56 is shut, fluid flow rate is reduced, thus increasing the damping force produced. Therefore, when the valve body 50 is shifted to the lowered position, the shock absorber works in HIGH damping force mode to produce a higher damping force against vertical shocks.

A bottom valve 66 is installed between the lower fluid chamber 28 and the fluid reservoir chamber 30. The bottom valve 66 is secured to the lower end of the inner cylinder and includes fluid passages 68 and 70. The upper end of the fluid passage 68 is closed by a flow-restriction valve 72. The lower end of the fluid passage 70 is closed by a flow-restriction valve 74.

Figure 3:
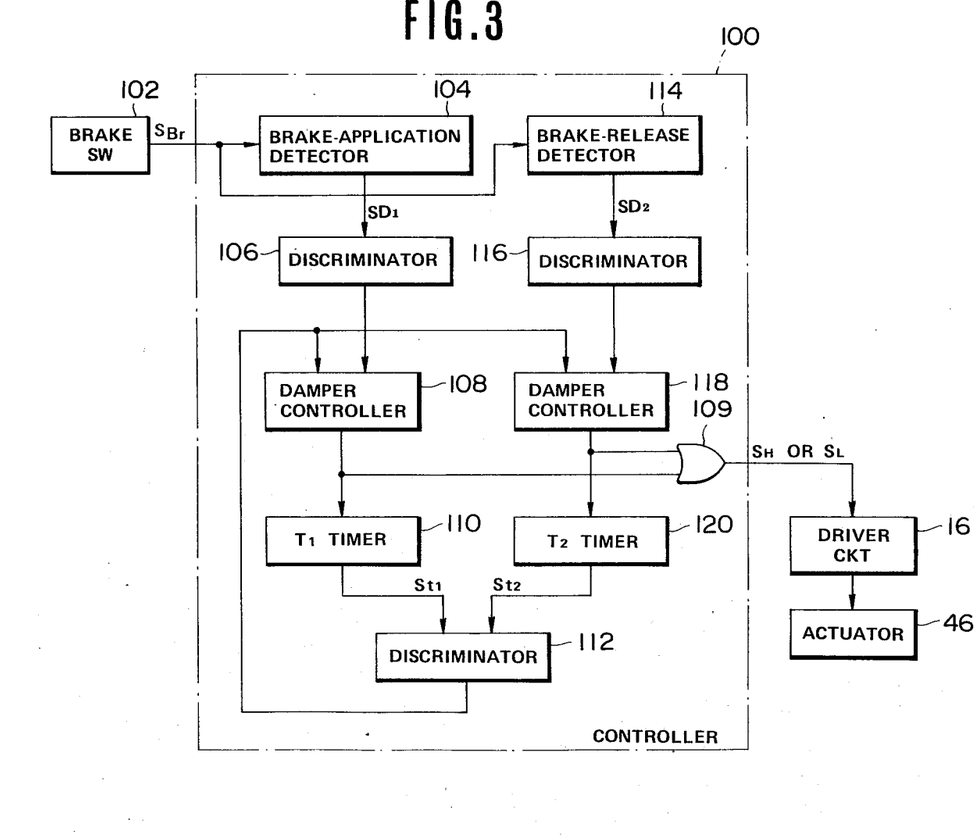
FIG. 3 is a block diagram of the first embodiment of a suspension control system according to the present invention.

FIG. 3 shows the first embodiment of the controller 100 which controls shock absorbing characteristics during vehicle deceleration. The controller 100 includes a brake-application detector 104 which is triggered by the rising edge of a HIGH-level brake switch signal $S_{Br}$ from the brake switch produced when the brake switch 102 is closed. The brake-application detector 104 produces a HIGH-level detector signal $S_{D1}$ in response to the HIGH-level brake switch signal $S_{Br}$. The HIGH-level detector signal $S_{D1}$ is fed to a descriminator 106. The discriminator 106 is responsive to the HIGH-level detector signal $S_{D1}$ from the brake application detector 104 to output a HIGH-level discriminator signal to a damper controller 108. The damper controller 108 is responsive to the HIGH-level discriminator signal to send a HIGH-level control signal $S_H$ to the driver circuit 16 via an OR gate 109 to activate the latter. At the same time, a $T_1$ timer 110 for measuring a given period of time $T_1$ is activated by the HIGH-level control signal from the damper controller 108. The $T_1$ timer 110 produces a HIGH-level timer signal $S_{t1}$ after the given period of time $T_1$ expires. The timer signal $S_{t1}$ is fed to a discriminator 112. The discriminator 112 is responsive to the HIGH-level timer signal $S_{t1}$ to produce a HIGH-level discriminator signal which is conducted to the damper controller 108. The damper controller 108 is responsive to the HIGH-level discriminator signal from the discriminator 112 to switch the control signal level from HIGH to LOW. The driver circuit 16 is deactivated by LOW level control signal $S_L$ from the damper controller 108, thus deenergizing the actuator 46 of the shock absorber 14.

Therefore, the shock absorber 14 is operated to produce a stronger damping force in response to application of the brake and remains in the HIGH damping force mode for the given period of time $T_1$, and is operated to switch from HIGH damping force mode to LOW damping force mode after the given period of time $T_1$ expires.

The controller 100 further comprises a brake release detector 114 which responds to the trailing edge of the HIGH-level brake switch signal $S_{Br}$ by producing a HIGH-level detector signal $S_{D2}$. The brake-release detector 114 is connected to a discriminator 116. The discriminator 116 is responsive to the HIGH-level detector signal $S_{D2}$ to produce a HIGH-level discriminator signal. The discriminator signal is fed to a damper controller 118 which outputs a HIGH-level control signal $S_H$ to be fed to the driver circuit 16 via the OR gate 109. The driver circuit 16 is activated by the HIGH-level control signal $S_H$ from the damper controller 118, to energize the actuator 46 to close the fluid passage 56. As a result, damping force to be produced by the shock absorber 14 increases.

In response to the HIGH-level control signal, a $T_2$ timer 120 also becomes active to measure the given period of time $T_2$. The timer 120 produces a HIGH-level timer signal $S_{t2}$ after the given period of time $T_2$ expires. The HIGH-level timer signal $S_{t2}$ is fed to the discriminator 112 to trigger the latter. When the discriminator 112 is triggered by the HIGH level timer signal $S_{t2}$, it sends a HIGH-level discriminator signal to the damper controller 118. The damper controller 118 is responsive to the HIGH-level descriminator signal from the discriminator 112 to switch the control signal level from HIGH to LOW. In response to the LOW-level control signal $S_L$, the driver circuit 16 is deactivated to deenergize the actuator 46.

Therefore, the damping force produced by the shock absorber 14 increases in response to release of the brakes, remains relatively high for the given period of time $T_2$, and returns to its original low level after the given period of time $T_2$ expires.

The behavior of the front end of the vehicle during deceleration under suspension control as set forth above, is illustrated in FIG. 4. In FIG. 4, the solid line represents the behavior of the front end of a vehicle to which the foregoing first embodiment of suspension control system is applied. On the other hand, the phantom line represents the behavior of a vehicle equipped with a normal suspension. As will be appreciated herefrom, by stiffening the shock absorber in response to application of brakes for the period of time $T_1$, which is chosen to be longer than the period of time during which significant shift of the center of gravity may occur, the magnitude of nose dive is reduced in comparison with that occurring with a normal suspension. On the other hand, by stiffening the shock absorber in response to release of the brakes, final rebound of the vehicle can be satisfactorily suppressed. The period of time $T_2$ for which the shock absorber remains in HIGH damping force mode is chosen to be longer than the period of time required for the shifted center of gravity to return to its normal position.

Therefore, according to the shown embodiment, by operating the shock absorber to produce a relatively strong damping force even after the brake is released, uncomfortable rebounding behavior can be successfully suppressed.

Additionally, according to the shown embodiment, since the shock absorber can be stiffened only when a stronger damping force is required, a relatively weak damping force can be applied under normal vehicle conditions. This relatively soft suspension will ensure good riding comfort. On the other hand, by temporarily providing a relatively strong damping force sufficient to ensure driving stability as required, driving safety can be enhanced.

Figure 5:
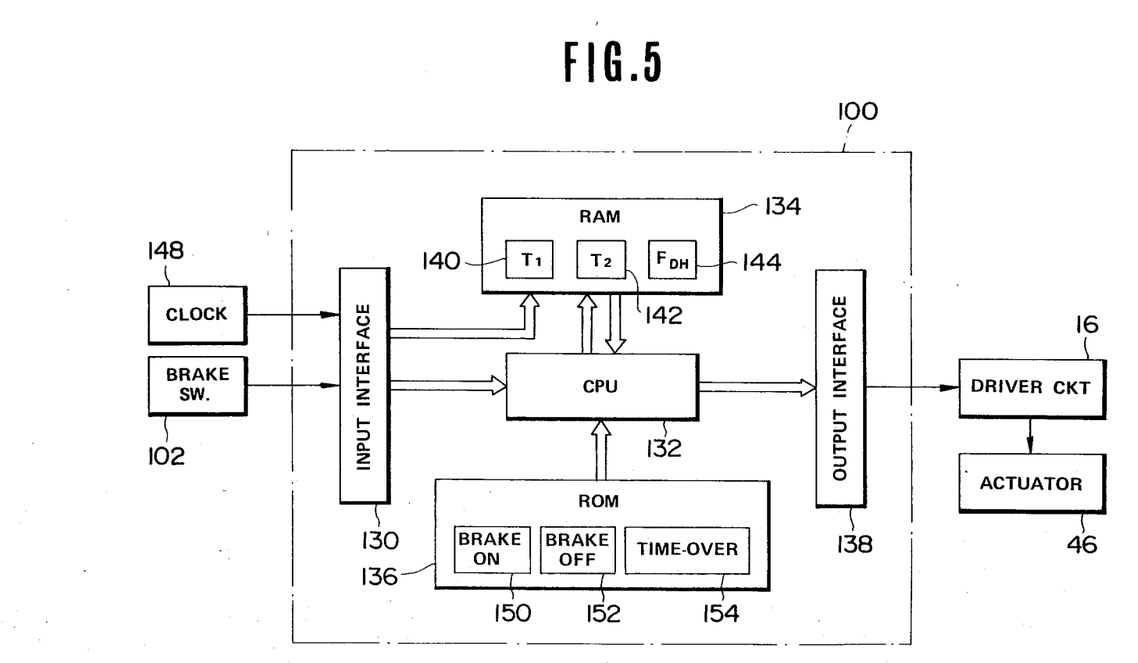
FIG. 5 is a schematic block diagram of the second embodiment of the suspension control system according to the present invention, in which a microprocessor is employed as a controller.

FIG. 5 shows the second embodiment of the controller 100 of the suspension control system in accordance with the present invention. In this embodiment, the controller 100 comprises a microprocessor including an input interface 130, CPU 132, RAM 134, ROM 136 and an output interface 138. RAM 134 has memory blocks 140, 142, and 144. The memory blocks 140 and 142 are adapted to count clock pulses from a clock generator 148 in order to measure the given periods of time $T_1$ and $T_2$. The memory block 144 serves as a flag; it is set when the shock absorber is in HIGH damping force mode and reset when the shock absorber is in LOW damping force mode. The memory block 144 will be hereafter referred to as "HIGH mode flag register" and the flag to be set therein will be referred to as "HIGH mode flag $F_{DH}$".

ROM 136 has memory blocks 150 and 152 respectively storing first and second control programs. The first program stored in the memory block 150 is adapted to be executed in response to application of the brakes (brake ON). On the other hand, the second control program is adapted to be executed in response to release of the brakes (brake OFF). ROM also has a memory block 154 storing a third control program which is triggered by timer signals from the memory blocks 140 and 142, which are produced upon expiration of either of the given periods of time $T_1$ and $T_2$.

Figure 6:
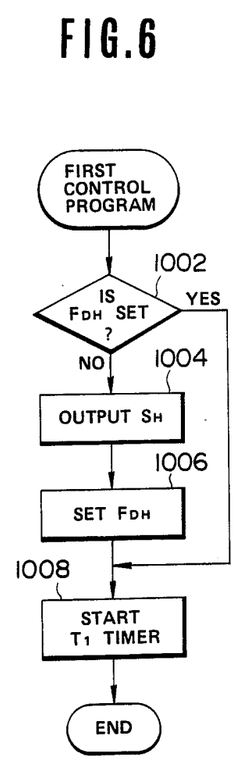
FIG. 6 is a flowchart of a first control program to be executed in response to application of a brake by the controller of FIG. 5.

FIG. 6 shows the first control program to be executed in response to application of the brakes and thus in response to the leading edge of the HIGH-level brake switch signal $S_{Br}$. At the initial stage of execution of the first control program, the HIGH mode flag $F_{DH}$ is checked at a block 1002 to judge whether or not the shock absorber is already in HIGH damping force mode. If the shock absorber is in LOW damping force mode, the HIGH-level control signal $S_H$ is fed to the driver circuit 16 to energize the actuator 46 to shift the valve body 50 to the lower position at a step 1004. In the lowered position, the valve body 50 blocks fluid communication between the upper and lower chambers 26 and 28, thus increasing resistance to fluid flow and so increasing the damping force produced. After this, the HIGH mode flag $F_{DH}$ is set at a step 1006. Then, the $T_1$ timer memory block 140 is started in order to measure the given period of time $T_1$ starting from the setting of the shock absorber at HIGH damping force mode, at a step 1008. If the HIGH mode flag is set when checked at the step 1002, control jumps to the step 1008 directly to measure the given period of time $T_1$.

As in the first embodiment, the memory block 140 produces a HIGH-level timer signal $S_{t1}$ after the measured period of time reaches the given period of time $T_1$ to trigger CPU 132 to execute the third control program of FIG. 8, which will be described later.

Figure 7:
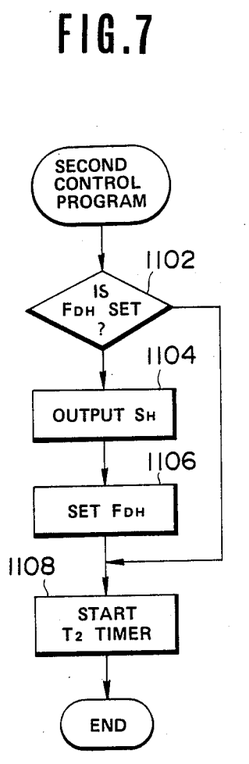
FIG. 7 is a flowchart of a second control program to be executed in response to release of the brakes by the controller of FIG. 5.

The second control program of FIG. 7 is adapted to be executed in response to release of the brakes and, thus, in response to the trailing edge of the HIGH-level brake switch signal $S_{Br}$. As in the first control program, the operational mode of the shock absorber is checked at the initial stage of the second control program, at a step 1102. If the operational mode of the shock absorber is not HIGH mode and thus the HIGH mode flag is not set when checked at the step 1102, then the HIGH level control signal $S_H$ is fed to the driver circuit 16 to energize the actuator 46 at a step 1104. After this, the HIGH mode flag $F_{DH}$ is set at a step 1106. The memory block 142 is then accessed and activated to start counting the clock pulses from the clock generator 148 at a step 1108. The memory block 142 is adapted to produce a HIGH-level timer signal $S_{t2}$ when the count value reaches the given value corresponding to the given period of time $T_2$. The CPU 132 is triggered by the HIGH-level timer signal $S_{t2}$ to execute the third control program. If the HIGH mode flag is set when checked at the step 1102, then, control jumps directly to the step 1108.

Figure 8:
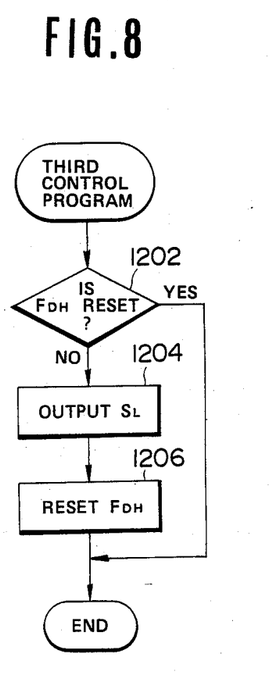
FIG. 8 is a flowchart a third control program which is triggered by a timer signal produced by a timer set upon completion of said first and second programs.

As set forth above, the third control program of FIG. 8 is executed in response to either one of the HIGH level timer signals $S_{t1}$ and $S_{t2}$. At the initial stage of execution, the operational mode of the shock absorber is checked at a step 1202. If the shock absorber is not in LOW damping force mode when checked at the step 1202, then LOW level control signal $S_L$ is fed to the driver circuit 16 to deactivate the actuator 46 at a step 1204. Thereafter, at a step 1206, the HIGH mode flag $F_{DH}$ is reset. On the other hand, if the reset state of the HIGH mode flag $F_{DH}$ is detected when checked at the step 1202, then the program ends immediately.

Figure 9:
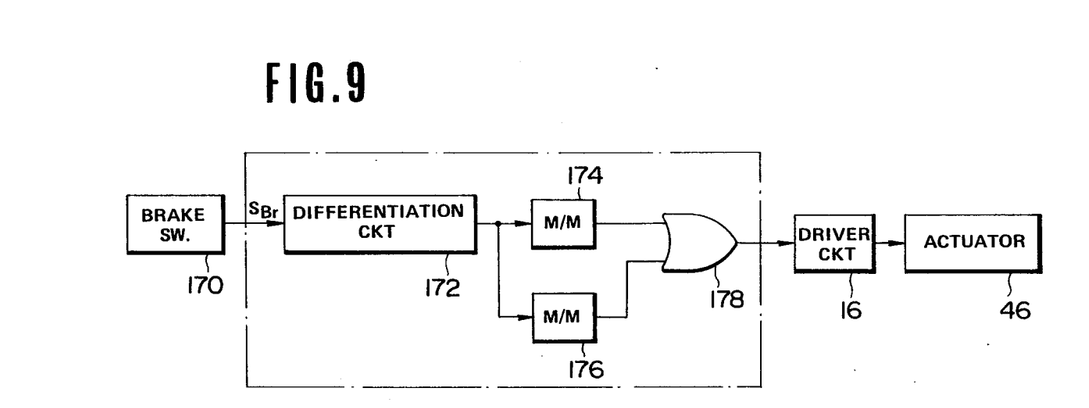
FIG. 9 is a schematic block diagram of the third embodiment of the suspension control system according to the present invention.

FIG. 9 shows the third embodiment of the control system according to the present invention. In this embodiment, the brake switch 170 is connected to a differentiation circuit 172 in the controller 100. The differentiation circuit 172 is responsive to the leading edge of the HIGH-level brake switch signal $S_{Br}$ to produce a positive pulse and is responsive to the trailing edge of the HIGH-level brake switch signal to produce a negative pulse. The differentiation circuit 172 is connected to monostable multivibrators 174 and 176. The monostable multivibrator 174 is responsive to the positive pulse signal from the differentiation circuit 172. Similarly, the monostable multivibrator 176 is responsive to the negative pulse of the differentiation circuit 172. The monostable multivibrators 174 and 176 are triggered by the corresponding pulse phases to feed trigger signals to the driver circuit 16 via an OR gate 178. The driver circuit 16 is responsive to either of the trigger signals from one of the monostable multivibrators 174 and 176 to be actuated to energize the actuator 46 as long as the trigger signal continues.

The monostable multivibrator 174 has a time constant which corresponds to the period of time $T_1$. Similarly, the monostable multivibrator 176 has a time constant corresponding to the period of time $T_2$. Therefore, the trigger signals from the monostable multivibrator 174 and 176 remain HIGH for periods $T_1$ and $T_2$, respectively. As a result, the actuator 46 is held energized to hold the damping forced to be produced by the shock absorber HIGH for periods $T_1$ and $T_2$.

Figure 10:
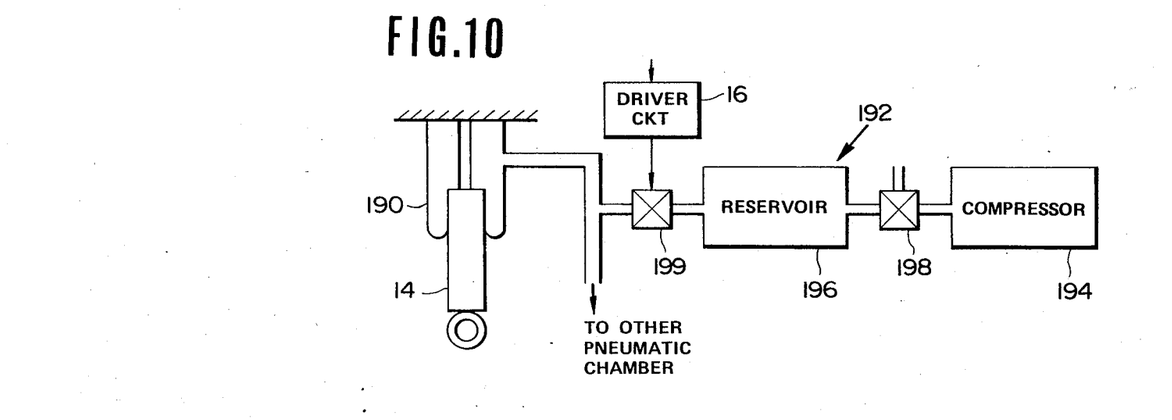
FIG. 10 is a diagram of another arrangement of a variable-damping-force vehicle suspension to which the preferred embodiments of the suspension control systems are applicable.

FIG. 10 shows another arrangement of the automotive suspension system to which the control system according to the present invention is applicable. In the shown system, an expandable and contractable pneumatic chamber 190 is formed above the shock absorber 14. The pneumatic chamber 190 is connected to a pressurized pneumatic fluid source 192. The fluid source 192 comprises a compressor 194 for pressurizing a fluid such as air, a reservoir tank 196 connected to the compressor 194 through an induction valve 198, and a pressure control valve 199. The pressure control valve 199 and the induction valve 198 are connected to the driver circuit 16 to be controlled thereby. Specifically, the induction valve 198 switches between induction mode and ventilation mode. In the induction mode, the fluid reservoir 196 is connected to the compressor 192 to receive the pressurized fluid. On the other hand, the fluid reservoir 196 is open to atmosphere to decrease the fluid pressure in the ventilation mode of the induction valve.

The pressure control valve 199 is co-operative with the induction valve 198 to adjust the fluid pressure in the pneumatic chamber 190 in accordance with vehicle driving conditions.

According to the shown embodiment, the driver circuit 16 may be connected to the control system of any of the first to third embodiments so that it is activated in response to application and release of the vehicle brakes. When energized by the driver circuit, the pressure control valve 199 closes to block pneumatic fluid communication between the pneumatic chamber 190 and the fluid reservoir 196. As a result, the effective volume of the pneumatic chamber 190 corresponds to that of the pneumatic chamber. Since the damping characteristics due to the pneumatic pressure in the pneumatic chamber is related to the effective volume of the pneumatic chamber and a smaller volume is achieved by blocking fluid communication between the pneumatic chamber and the fluid reservoir, the pneumatic chamber becomes relatively rigid in this case, providing a larger damping force in response to application or release of the brakes.

On the other hand, in the normal valve position, the pressure control valve 199 opens to establish fluid communication between the pneumatic chamber and the fluid reservoir. As a result, the effective volume becomes equal to the sum of the volumes of the pneumatic chamber and the fluid reservoir. By providing a larger effective volume, damping characteristics of the pneumatic chamber are weakened.

The above-mentioned suspension system structure of FIG. 10 has been disclosed in U.S. Pat. No. 4,349,077 to Sekiguchi et al and U.S. Pat. No. 4,327,936 to Sekiguchi. In addition, a similar system has been disclosed in the co-pending U.S. patent application Ser. No. 573,504, filed on Jan. 24, 1984, which corresponds to the co-pending European patent application No. 84100729.7, filed on Jan. 24, 1984. The disclosure of the above-identified U.S. Patents and the co-pending applications are herein incorporated by reference.

In the first and second embodiments, the shock absorber has been described having two-way variable damping characteristics, i.e. HIGH and LOW damping force modes. However, the present invention is applicable to shock absorbers which have damping characteristics which can assume more than two levels. For example, the invention is applicable to the shock absorber disclosed in the above-mentioned co-pending U.S. patent application Ser. No. 573,504. In additions, similar shock absorbers have been disclosed in British Patent First Publications 2,119,473A, 2,120,355A and 2,123,122A. The disclosure of the above-identified co-pending application and publications are herein incorporated by reference.

FIGS. 11 to 15 show the fourth embodiment of the suspension control system according to the present invention. In this embodiment, a shock absorber 200 is variable of the damping characteristics between SOFT, MEDIUM and HARD modes. It should be appreciated that the working "SOFT mode" corresponds to "LOW damping force mode" of the former embodiments, and the wording "HARD mode" corresponds to "HIGH damping force mode". The "MEDIUM mode" means a mode to produce a damping force intermediate between those produced in HARD and SOFT modes.

Figure 11:
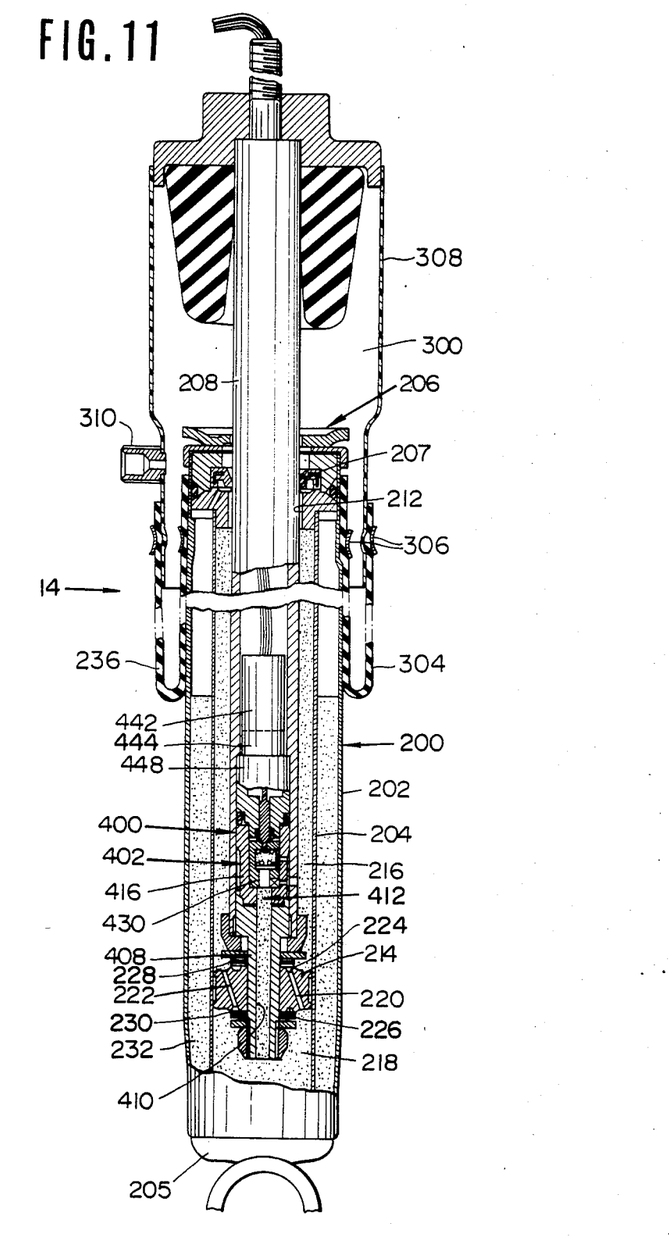
FIGS. 11 through 15 show a fourth embodiment of the suspension control system.

As shown in FIG. 11, a suspension strut 14 includes a hydraulic damper or shock absorber 200 which generates an adjustable damping force. A pneumatic chamber 300 connected to a pressure source in a height control system via an air tank is defined above the hydraulic shock absorber 200. The pressure within the pneumatic chamber 300 can be adjusted by introducing air from the pressure source or venting air from the pneumatic chamber depending upon the vehicle height detected and/or vehicle parameters such as vehicle speed.

A hydraulic shock absorber 200 has coaxial inner and outer cylinders 202 and 204. Top and bottom ends of the cylinders 202 and 204 are plugged with fittings 206 and 205. The fitting 206 includes a seal 207 which establishes a liquid-tight seal. A piston rod 208 extends through an opening 212 formed in the fitting 206 and is rigidly connected to a vehicle body (not shown) at its top end. The piston rod 208 is, in turn, connected to a piston 214 reciprocally housed within the inner cylinder 202 and defining upper and lower fluid chambers 216 and 218 therein.

The piston 214 is formed with fluid passages 220 and 222 connecting the upper and lower fluid chambers 216 and 218. The piston 210 also has annular grooves 224 and 226 along its upper and lower surfaces concentric with circumferential edges thereof. The upper end the fluid passage 220 opens into the groove 224. On the other hand, the lower end of the fluid passage 222 opens into the groove 226. Upper and lower check valves 228 and 230 are provided opposite the grooves 224 and 226 respectively to close the grooves when in their closed positions. The lower end of the fluid passage 220 opens onto the lower surface of the piston at a point outside of the check valve 230. Likewise the upper end of the fluid passage 222 opens onto the upper surface of the piston at a point outside of the check valve 228.

Therefore, the fluid passage 222 is active during the piston expansion stroke, i.e. during rebound of the shock absorber. At this time, the check valve 228 prevents fluid flow through the fluid passage 220. On the other hand, during the piston compression stroke, i.e. during bounding movement of the suspension, the fluid passage 220 is active, allowing fluid flow from the lower fluid chamber 218 to the upper fluid chamber 216 and the fluid passage 222 is blocked by the check valve 230.

The piston rod 208 has a hollow cylindrical shape so that a damping force adjusting mechanism, which will be referred to generally by the reference numeral "400" hereafter, can be housed therein. The damping force adjusting mechanism 400 includes a valve mechanism 402 for adjusting the cross-sectional area through which the working fluid can flow between the upper and lower chambers. In the preferred embodiment, the valve mechanism 402 allows three steps of variation of the damping force, i.e., HARD mode, MEDIUM mode and SOFT mode, the narrowest cross-sectional area representing the HARD mode, the widest the SOFT mode and intermediate the MEDIUM mode. Although the preferred embodiment of the invention will be described hereafter in terms of a three-way-adjustable damping force shock absorber, the number of adjustable positions of the shock absorber may be increased or decreased as desired and is not limited to the specific embodiment.

Figure 12:
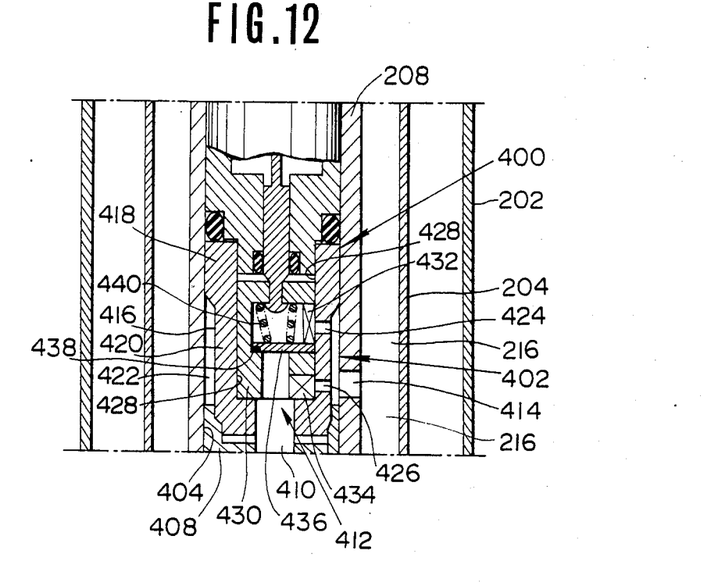

As shown in FIG. 12, the piston rod 208 defines an axially extending through opening 404 with the lower end opening into the lower fluid chamber 218. A fitting 408 seals the lower end of the opening 404 of the piston rod and has axially extending through opening 410, the axis of which is parallel to the axis of the through opening 404 of the piston rod. Thus, the through openings 404 and 410 constitute a fluid path 412 extending through the piston rod. The piston rod 208 also has one or more radially extending orifices or openings 414 opening into the upper fluid chamber 216. Thus, the upper and lower fluid chambers 216 and 218 are in communication through the fluid path 412 and the radial orifices 414.

A stationary valve member 416 with a flaring upper end 418 is inserted into the through opening 404 of the piston rod. The outer periphery of the flaring end 418 of the stationary valve member 416 is in sealing contact with the internal periphery of the through opening. The stationary valve member 416 has a portion 420 with a smaller diameter than that of the upper end 418 and so as to define an annular chamber 422 in conjunction with the inner periphery of the through opening 404 of the piston rod. The stationary valve member 416 has two sets of radially extending orifices 424 and 426 and an internal space 428. The radially extending orifices 424 and 426 establish communication between the internal space 428 and the annular chamber 422. A movable or rotary valve member 430 is disposed within the internal space 428 of the stationary valve member 416. The outer periphery of the rotary valve member 430 slidingly and sealingly contacts the inner surface of the stationary valve member 416 to establish a liquid-tight seal therebetween. Radially extending orifices 432 and 434 are defined in the rotary valve member 430 at positions opposite the orifices 424 and 426 of the stationary valve member 416.

Figure 13A:
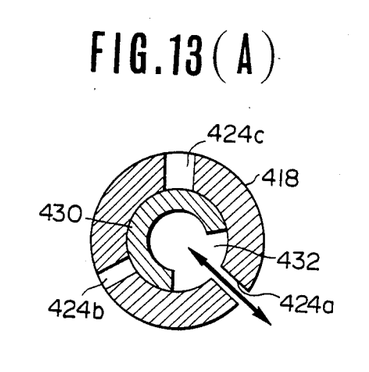
Figure 13B:
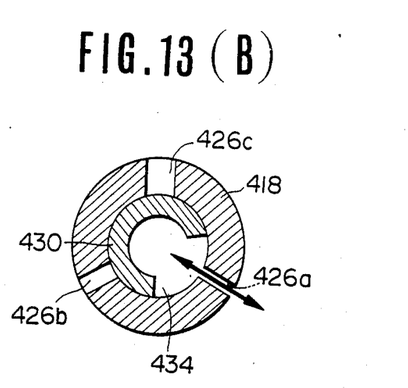

As shown in FIGS. 13(A) and 13(B), the orifices 424 and 426 respectively include first, second and third orifices 424a, 424b, 424c, and 426a, 426b and 426c. The first orifices 424a and 426a have the narrowest cross-sections and the orifices 432 and 434 are adapted to be in alignment with the first orifices to establish fluid communication between the upper and lower fluid chambers 216 and 218 in the case of the HARD mode. The third orifices 424c and 426c have the widest cross-sections and the orifices 432 and 434 are adapted to be in alignment with the third orifices in the case of the SOFT mode. The cross-sections of the second orifices 424b and 426c are intermediate those of the first and third orifices and the orifices 432 and 434 are adapted to align therewith in the case of the MEDIUM mode.

A check valve 436 is provided within an internal space of the rotary valve member 430. The check valve 436 is normally biased towards a valve seat 438 by means of a bias spring 440 for allowing one-way fluid flow from the lower fluid chamber to the upper fluid chamber. This cause the bound damping force to be somewhat weaker than the rebound damping force.

Figure 14:
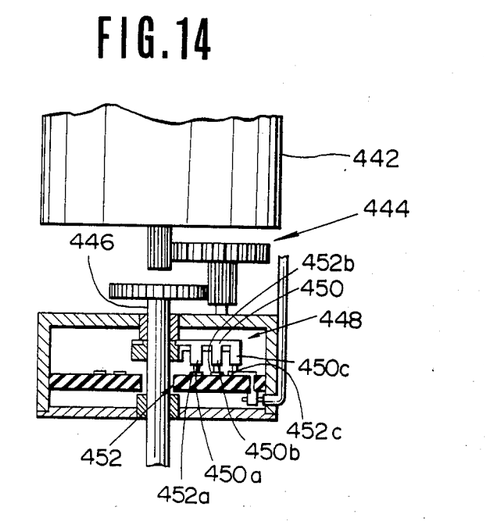

The rotary valve member 430 is associated with an electrically operable actuator such as an electrical step motor 442 through a differential gear unit 444 and an output shaft 446 as shown in FIG. 14. A potentiometer 448 is associated with the output shaft 446. The potentiometer 448 includes a movable contact 450 with contactors 450a, 450b and 450c. The contactors 450a, 450b and 450c are adapted to slidingly contact stationary contact elements 452a, 452b and 452c of a stationary contact 452. According to the electrical connections between the movable contact and the stationary contact, the potentiometer 448 produces a mode signal representative of the rotary valve position and thus indicative of the selected mode of the damping force adjusting mechanism. The step motor 442 is electrically connected to a controller 100 to receive the control signal as a mode selector signal which drive the motor 442 through an angle corresponding to the rotary valve movement to the corresponding valve position. In this case, the potentiometer will return the mode signal as a feedback signal to indicate the instantaneous valve position.

It should be appreciated that the controller 100 may be operated either in automatic mode or in manual mode.

Returning to FIG. 11, the shock absorber has a fluid reservoir chamber 232 between its inner and outer cylinders 202 and 204, which fluid reservoir chamber 232 is in communiation with the lower fluid chamber 218 via the bottom fitting 205 described previously. The bottom fitting 205 may serve to produce damping force in cooperation with the piston and the damping force adjusting mechanism during bounding and rebounding motion of the vehicle. A relatively low pressure pneumatic chamber 236 is also defined between the inner and outer cylinders 202 and 204.

The operation of the damping force adjusting mechanism 400 will be briefly described herebelow with reference to FIG. 13. FIGS. 13(A) and 13(B) show the case of the HARD mode. In this case, the orifice 432 of the rotary valve 430 is in alignment with the orifice 424a and the orifice 434 is in alignment with the orifice 426a. During vehicle rebounding motion, i.e., in the piston compression stroke, the fluid flows from the upper fluid chamber 216 to the lower fluid chamber 218 though the orifice 426a. On the other hand, during vehicle bounding motion, the fluid flows from the lower fluid chamber 218 to the upper fluid chamber 216 through orifices 424a and 426a. Since the first orifices 424a and 426a and the narrowest, the damping force produced in this mode is the highest among the three selectable modes.

In case of the MEDIUM mode, the orifices 432 and 434 of the rotary valve member 430 are respectively in alignment with the second orifices 424b and 426b.

In case of the SOFT mode, the orifices 432 and 434 align with the third orifices 424c and 426c, respectively to cause fluid flow. Since the third orifices 424c and 426c are the widest of the three sets, as described above, the damping force created in this SOFT mode is the lowest.

According to the shown embodiment, the electric step motor 442 is connected to the controller 100 through the driver circuit 16. Similarly to the aforementioned embodiments, the controller 100 is connected to the brake switch 102 to receive the brake switch signal $S_{Br}$ therefrom. The construction of the controller 100 is substantially the same as that illustrated with respect to FIG. 5. However, the controller 100 of this embodiment is adapted to produce three-way control signal for operating the shock absorber to one of SOFT, MEDIUM and HARD modes. The driver circuit 16 is responsive to the control signal to drive the step motor 442 to operate the rotary valve member 430 to the corresponding valve position.

Figure 15:
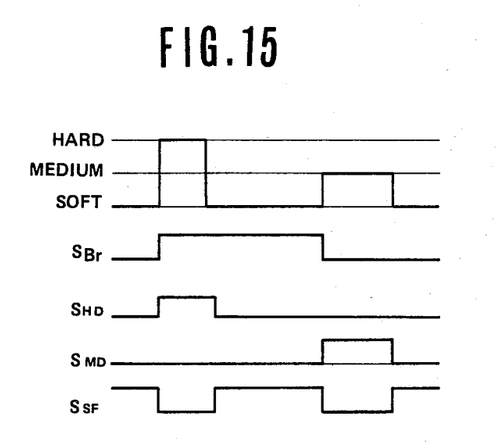

As shown in FIG. 15, the controller 100 operate the rotary valve 430 to place the shock absorber at HARD mode position in response to the leading edge of the HIGH level brake switch signal $S_{Br}$. The shock absorber is maintained at HARD mode position for the given period of time $T_1$. Similarly, the controller 100 produced the control signal designating MEDIUM mode of the shock absorber in response to the trailing edge of the HIGH level brake switch signal $S_{Br}$. The shock absorber is maintained at the MEDIUM mode position for the given period of time $T_2$.

It should be noted that, in the shown embodiment, the shock absorber is naturally placed at the SOFT mode position for providing satisfactory riding comfort.

The controller 100 executes first, second and third control programs for operating the shock absorber as set forth above.

Figure 16:
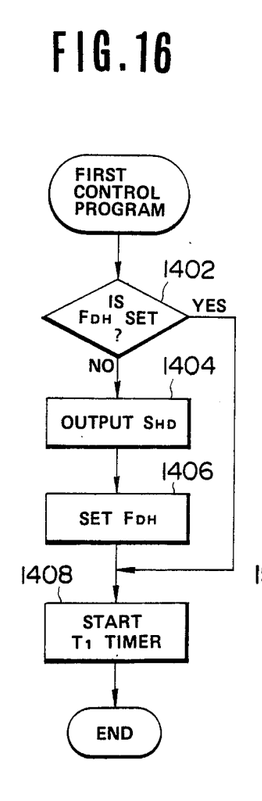
FIG. 16 shows a first control program for operating the disclosed shock absorber in response to application of the brakes.

FIG. 16 shows the first control program to be executed in response to application of the brakes and thus in response to the leading edge of the HIGH-level brake switch signal $S_{Br}$. At the initial stage of execution of the first control program, the HIGH mode falg $F_{DH}$ is checked at a block 1402 to judge whether or not the shock absorber is already in HIGH damping force mode. If the shock absorber is in LOW damping force mode, the HARD-mode control signal $S_{HD}$ is fed to the driver circuit 16 to energize the step motor 442 to shift the rotary valve member 430 to the HARD mode position at a step 1404. In the HARD mode position, the rotary valve member 430 blocks limits communication between the upper and lower chambers 216 and 218 at a minimum flow rate, thus increasing resistance to fluid flow and so increasing the damping force produced. After this, the HIGH mode flag $F_{DH}$ is set at a step 1406. Then, the $T_1$ timer memory block 140 is started in order to measure the given period of time $T_1$ starting from the setting of the shock absorber at HARD damping force mode, at a step 1408. If the HIGH mode flag is set when checked at the step 1402, control jumps to the step 1408 directly to measure the given period of time $T_1$.

As in the first embodiment, the memory block 140 produces a HARD-mode timer signal $S_{t1}$ after the measured period of time reaches the given period of time $T_1$ to trigger CPU 132 to execute the third control program of FIG. 18, which will be described later.

Figure 17:
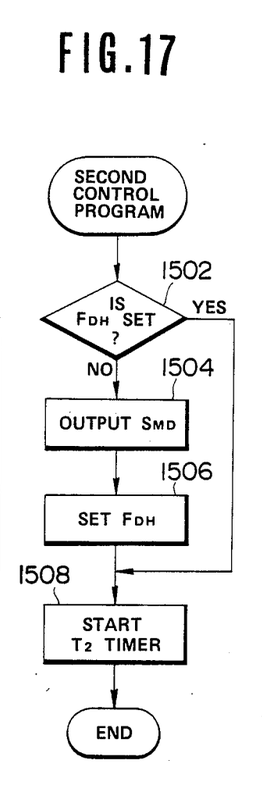
FIG. 17 shows a second control program for operating the disclosed shock absorber in response to release of the brakes.

The second control program of FIG. 17 is adapted to be executed in response to release of the brakes and, thus, in response to the trailing edge of the HIGH-level brake switch signal $S_{Br}$. As in the first control program, the operational mode of the shock absorber is checked at the initial stage of the second control program, at a step 1502. If the operational mode of the shock absorber is SOFT mode and thus the HIGH mode flag $F_{DH}$ is not set when checked at the step 1502, then the MEDIUM mode control signal $S_{MD}$ is fed to the driver circuit 16 to energize the step motor 442 to operate the rotary valve member to the MEDIUM mode position at a step 1504. After this, the HIGH mode flag $D_{DH}$ is set at a step 1506. The memory block 142 is then accessed and activated to start counting the clock pulses from the clock generator 148 at a step 1508. The memory block 142 is adapted to produce a HIGH-level timer signal $S_{t2}$ when the count value reaches the given value corresponding to the given period of time $T_2$. The CPU 132 is triggered by the HIGH-level timer signal $S_{t2}$ to execute the third control program. If the HIGH mode flag is set when checked at the step 1502, then, control jumps directly to the step 1508.

Figure 18:
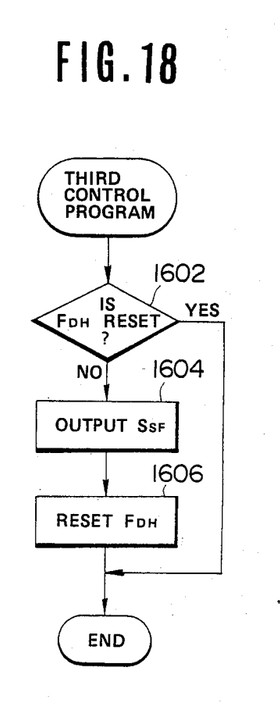
FIG. 18 shows a third control program for operating the disclosed shock absorber in response to either one of the HIGH lever timer signals.

As set forth above, the third control program of FIG. 18 is executed in response to either one of the HIGH level timer signals $S_{t1}$ and $S_{t2}$. At the initial stage of execution, the operational mode of the shock absorber is checked at a step 1602. If the shock absorber is not in SOFT mode when checked at the step 1602, then SOFT MODE control signal $S_{SF}$ is fed to the driver circuit 16 to operate the step motor 430 at a step 1604 to place the rotary valve member 430 at the SOFT mode position. Thereafter, at a step 1602, the HIGH mode flag $F_{DH}$ is reset. On the other hand, if the reset state of the HIGH mode flag $F_{DH}$ is detected when checked at the step 1602, then the program ends immediately.

According to the present invention as disclosed hereabove in terms of the preferred embodiments of the invention, uncomfortable rebound which may occur in response to release of the brakes can be satisfactorily suppressed. Furthermore, since the damping force can be increased according to vehicle driving conditions, the shock absorber may normally remain in the LOW damping force mode, so as to achieve good riding comfort, without degrading driving stability or causing significant pitching motion during deceleration.

What is claimed is:

1. A damper control system for an automotive vehicle suspension having a damping characteristic comprising:
first means, interposed between a sprung mass and an unsprung mass of the vehicle, for producing a damping force resisting relative displacement of said sprung mass and said unsprung mass;
a braking condition detector for producing a binary braking state indicative signal pulse having a leading edge and a trailing edge, the pulse extending as long as a vehicle brake is applied;
an actuator for operating said first means between a first and a second position to change the damping characteristics of the suspension to produce a higher damping force in the first position, and to produce a lower damping force in the second position; and
a controller connected with said actuator and said braking condition detector to operate said actuator at the first position in response to each of the leading and trailing edges of the braking state indicative signal pulse.

2. The damper control system as set forth in claim 1, wherein said controller holds said actuator in said first position for a first given period of time in response to the leading edge of the braking state indicative signal pulse and for a second given period of time in response to the trailing edge of the braking state indicative signal pulse.

3. The damper control system as set forth in claim 2, wherein said first means comprises a shock absorber including a piston and a damping characteristics control valve associated with said actuator to operate said control valve at a third position while said actuator is in its first position and at a fourth position while the actuator is in its second position.

4. The damper control system as set forth in claim 2, wherein said first means is a suspension strut assembly including second means for defining a variable pressure pneumatic chamber, the volume of said pneumatic chamber being reduced when the actuator is in its first position and being increased when the actuator is in its second position.

5. The damper control system as set forth in claim 2, wherein said controller comprises a microprocessor executing a first control program in response to the leading edge of the braking state indicative signal pulse to increase the damping force of said first means for said first period of time, a second control program in response to the trailing edge of the braking state indicative signal pulse to increase the damping force of the first means for said second period of time, and a third control program to decrease the damping force of said first means for a third period of time between said first and second periods of time.

6. The damper control system as set forth in claim 2, wherein said controller includes a first signal generator responsive to the leading edge of the braking state indicative signal pulse to produce a first signal for bringing said actuator to the first position and maintaining the actuator in the first position for the first period of time, and a second signal generator responsive to the trailing edge of the braking state indicative signal pulse to produce a second signal for bringing said actuator to the first position and maintaining said actuator in the first position for the second period of time.

7. A damper control system for an automotive vehicle suspension having a damping characteristic comprising:
first means, interposed between a sprung mass and an unsprung mass of the vehicle, for producing a damping force resisting relative displacement of said sprung mass and said unsprung mass;
a braking condition detector for producing a binary braking state indicative signal pulse having a leading edge and a trailing edge, the pulse extending as long as a vehicle brake is applied;
an actuator for operating said first means among a plurality of operational positions for varying the damping characteristics of the suspension to produce a corresponding damping force, said actuator operating said first means in one of a plurality of operational modes having different damping forces in accordance with the damping characteristics, and said actuator being held at a first operational position for maintaining said first means in a first operational mode to produce a relatively low damping force in normal state; and a controller connected with said actuator and said braking condition detector to operate said first means in a second operational mode to produce a relatively high damping force in response to the leading edge of the braking state indicative signal pulse and in a third operational mode to produce a damping force greater than the relatively low damping force produced in the first operational mode and smaller than the relatively high damping force produced in the second operational mode.

8. The damper control system as set forth in claim 7, wherein said controller holds said actuator at a second position corresponding to the second operational mode of said first means for a first given period of time, and at a third position corresponding to said third operational mode of the first means for a second given period of time.

9. The damper control system as set forth in claim 8, wherein said controller comprises a microcomputer executing a first control program in response to the leading edge of the braking state indicative signal pulse for operating said actuator to the second position, a second control program in response to the trailing edge of the braking state indicative signal pulse for operating said actuator to the third position, and a third control program for operating said actuator to the first position between the first and second periods of time.

10. The damper control system as set forth in claim 9, wherein said first means comprises a hydraulic shock absorber including a piston and first and second fluid chambers having variable volumes thereof according to displacement of said piston, said shock absorber further including a fluid passage for fluid communication between said first and second fluid chambers, and a valve member provided in said fluid passage for varying the path area of said fluid passage and connected with said actuator to change valve position corresponding to the position of said actuator.

11. A method of controlling a damper or dampers of a vehicle suspension system, comprising the steps of:
detecting the application and release of vehicle brakes and generating signals representative thereof;
increasing the stiffness of the damper or dampers for a predetermined period of time in response to the signal representing the application of the brakes; and
increasing the stiffness of the damper or dampers for a predetermined period of time in response to the signal representing the release of the brake.

12. A damper control system for an automotive vehicle suspension having a damping characteristic comprising:
first means, interposed between a sprung mass and an unsprung mass of the vehicle, for producing a damping force resisting relative displacement of said sprung mass and said unsprung mass;
a braking condition detector for producing a binary braking state indicative signal pulse having a leading edge and a trailing edge, the pulse extending as long as a vehicle brake is applied;
an actuator for operating said first means between a first and a second position to change the damping characteristics of the suspension to produce a higher damping force in the first position, and to produce a lower damping force in the second position; and
a controller connected with said actuator and said braking condition detector to operate said actuator at the first position in response to the leading edge of the braking state indicative signal pulse.

13. A damper control system for an automotive vehicle suspension having a damping characteristic comprising:
first means, interposed between a sprung mass and an unsprung mass of the vehicle, for producing a damping force resisting relative displacement of said sprung mass and said unsprung mass;
a braking condition detector for producing a binary braking state indicative signal pulse having a leading edge and a trailing edge, the pulse extending as long as a vehicle brake is applied;
an actuator for operating said first means among a plurality of operational positions for varying the damping characteristics of the suspension to produce a corresponding damping force, said actuator operating said first means in one of a plurality of operational modes having different damping forces in accordance with the damping characteristics, and said actuator being held at a first operational position for maintaining said first means in a first operational mode to produce a relatively low damping force in normal state; and
a controller connected with said actuator and said braking condition detector to operate said first means in a second operational mode to produce a relatively high damping force in response to the leading edge of the braking state indicative signal pulse for a given period of time.

14. A method of controlling a damper or dampers of a vehicle suspension system, comprising the steps of:
providing means for adjusting stiffness of said damper or dampers;
detecting the application of vehicle brakes and generating a binary braking state indicative signal pulse having a leading edge representative of the application; and
increasing the stiffness of said damper or dampers for a predetermined period of time in response to the leading edge of the brake indicative signal.

15. A damper control system for an automotive vehicle suspension having a damping characteristic comprising:
first means, interposed between a sprung mass and an unsprung mass of the vehicle, for producing a damping force resisting relative displacement of said sprung mass and said unsprung mass;
a braking condition detector for producing a binary braking state indicative signal pulse having a leading edge and a trailing edge, the pulse extending as long as a vehicle brake is applied;
an actuator for operating said first means between a first and a second position to change the damping characteristics of the suspension to produce a higher damping force in the first position, and to produce a lower damping force in the second position; and
a controller connected with said actuator and said braking condition detector to operate said actuator at the first position in response to the trailing edge of the braking state indicative signal pulse.

16. A damper control system for an automotive vehicle suspension having a damping characteristic comprising:

first means, interposed between a sprung mass and an unsprung mass of the vehicle, for producing a damping force resisting relative displacement of said sprung mass and said unsprung mass;

a braking condition detector for producing a binary braking state indicative signal pulse having a leading edge and a trailing edge, the pulse extending as long as a vehicle brake is applied;

an actuator for operating said first means among a plurality of operational positions for varying the damping characteristics of the suspension to produce a corresponding damping force, said actuator operating said first means in one of a plurality of operational modes having different damping forces in accordance with the damping characteristics, and said actuator being held at a first operational position for maintaining said first means in a first operational mode to produce a relatively low damping force in normal state; and a controller connected with said actuator and said braking condition detector to operate said first means in a second operational mode to produce a relatively high damping force in response to the trailing edge of the braking state indicative signal pulse for a given period of time.

17. A method of controlling a damper or dampers of a vehicle suspension system, comprising the steps of:

providing means for adjusting stiffness of said damper or dampers;

detecting the application and release of vehicle brakes and generating signals representative thereof; and increasing the stiffness of said damper or dampers for a predetermined period of time in response to the signal representing the release of the brakes.

* * * * *